United States Patent [19]

Oishi et al.

[11] Patent Number: 5,045,954

[45] Date of Patent: Sep. 3, 1991

[54] MAGNETIC RECORDING AND PLAYBACK APPARATUS FOR SERIAL DATA HAVING A VARIABLE BIT TRANSFER RATE

[75] Inventors: Hiroaki Oishi, Tokyo; Shinji Aoki, Kanagawa; Hideo Kawamoto, Tokyo, all of Japan

[73] Assignee: Sony Corporation, Tokyo, Japan

[21] Appl. No.: 302,957

[22] Filed: Jan. 30, 1989

[30] Foreign Application Priority Data

Jan. 30, 1988 [JP] Japan .................................. 63-21076
Jan. 30, 1988 [JP] Japan .................................. 63-21077

[51] Int. Cl.$^5$ .......................... G11B 5/00; G11B 15/46; G11B 5/584; G11B 21/04
[52] U.S. Cl. ........................................... 360/8; 360/70; 360/73.05; 360/77.13
[58] Field of Search ............... 360/8, 70, 73.05, 73.06, 360/73.07, 77.13, 77.14, 77.15, 77.16

[56] References Cited

U.S. PATENT DOCUMENTS 4,303,950 12/1981 Taniguchi et al. ...................... 360/8
4,391,161 6/1983 Ota et al. ................................ 360/8
4,594,631 6/1986 Noguchi et al. ...................... 360/70

*Primary Examiner*—David J. Severin
*Assistant Examiner*—Varsha V. Sheladia
*Attorney, Agent, or Firm*—Alvin Sinderbrand; William S. Frommer

[57] ABSTRACT

A magnetic recording and playback apparatus using a magnetic head disposed on a rotating drum for forming oblique recording tracks in succession on a magnetic tape to record or playback serial data along the same, has a tracking control for controlling the height of the magnetic head in the direction perpendicular to the length of the recording track. A speed control is included for controlling the rotating speed of the rotating drum and/or the traveling speed of the magnetic tape in accordance with the bit transfer rate of the serial data so that the magnetic tape travels one reference track pitch while the rotating drum makes an integer number of rotations. A processor is included for compressing the serial data along the time base so that the serial data is recorded while the magnetic head scans the recording track.

6 Claims, 2 Drawing Sheets

MAGNETIC RECORDING AND PLAYBACK APPARATUS FOR SERIAL DATA HAVING A VARIABLE BIT TRANSFER RATE

BACKGROUND OF THE INVENTION

1. Field of the Invention

The present invention relates to a magnetic recording and playback apparatus for a data recorder and more particularly to a magnetic recording and playback apparatus having a rotating drum with a magnetic head for recording or playing back a digital signal on a magnetic tape.

DESCRIPTION OF THE PRIOR ART

A data recoder has been proposed in which the rotating speed of the rotating drum and the traveling speed of the magnetic tape are controllably varied (Japanese Laid-open Patent Publication No. 60-658).

When incoming digital data to be serially recorded on a magnetic tape has different bit rates, the rotating speed of the drum and the traveling speed are controlled in response to the bit transfer rate of the serial data in accordance with a predetermined relationship to scan a track at a predetermined track angle. Thus, the scanning speed of the magnetic head is varied with respect to the magnetic tape in accordance with the bit transfer rate.

Hence, it is possible to form recording tracks with a predetermined track angle and with a predetermined track pitch (hereinafter to be called "reference track pitch") between the tracks and thereby record such digital data at the same recording wavelengths even if the serial data has different bit transfer rates (i.e., different bit lengths or different repetition frequencies.).

By selectively setting the recording wavelength at a predetermined value, high-density recording of digital data can be attained.

By controlling the rotating speed of the rotating drum and the traveling speed of the magnetic tape during data reproduction with the predetermined relationship therebetween, it is also possible to cause the magnetic head to scan the record track at a desired scanning speed, and thereby obtain serial data at a desired bit transfer rate.

Because serial data having a predetermined repetition frequency can be supplied by selectively setting the rotating speed of the rotating drum and the traveling speed of the magnetic tape to values corresponding to an information processing unit such as a computer, it is possible to obtain digital data for an information processing apparatus.

In performing such speed control of the rotating drum and the magnetic tape, there has been a problem in that it is difficult to provide a wide range of variable speeds.

More particularly, during recording, when the bit transfer rate of serial data becomes low and, as a result, the rotating speed of the rotating drum and the traveling speed of the magnetic tape are slowed down, the electromagnetic conversion characteristic of the magnetic head deteriorates and the signal level of the playback signal is lowered accordingly.

Similarly, when the rotating speed of the rotating drum and the traveling speed of the magnetic tape are slowed down during reproduction, the efficiency of the signal played back through a magnetic head is deteriorates. Hence, the signal level of the playback signal is lowered.

Therefore, when the speeds of the rotating drum and the magnetic tape are controlled, it is necessary to change the frequency characteristic of an equalizer circuit depending on the bit transfer rate of the serial data so as to compensate for the deteriorated SN ratio of the playback signal.

However, there has been a practical problem in implementation of such an equalizer circuit due to the complexity of the configuration needed for changing the frequency characteristic in accordance with the bit transfer rate.

With a data recorder the range of controlled variable speeds of the rotating drum and the magnetic tape is restricted in actual practice by the range of changeable frequency characteristics of the equalizer circuit. Accordingly, there has been a problem that such an arrangement cannot be applied to the digital data whose bit transfer rate varies over a wide range.

OBJECTS AND SUMMARY OF THE INVENTION

It is an object of the present invention to provide a magnetic recording and playback apparatus in which the above-mentioned problems are overcome.

As a method to solve the problems, a slow-motion playback technique in a video tape recorder (VTR) is adopted in the present invention.

More particularly, with the rotating drum being kept at a constant rotating speed, the traveling speed of the magnetic tape is controlled to vary in accordance with the bit transfer rate. The position of the magnetic head is controlled by a height control means formed, for example, of a piezoelectric device. The device controls the height to vary the magnetic head in the direction of the axis of rotation of the rotating drum (i.e., in the direction perpendicular to the recording track), and thereby achieve tracking control. Such a magnetic head disposed on the rotating drum is called "DT head".

At every time when the rotating drum makes a predetermined amount of rotation, the DT head is successively moved so as to trace the adjoining recording track. Hence, if the serial data is time-compressed and the DT head intermittently records the compressed data during an interval of scanning the recording track, the serial data can be recorded at the predetermined recording wavelength even when the bit transfer rate is extremely slow.

Similarly, it is possible to obtain the serial data at a desired bit transfer rate during reproduction, if the serial data is reproduced intermittently from the record track at the time when the DT head scans the track and if the reproduced data is time-expanded to be an original data.

In accordance with an aspect of this invention, a magnetic recording and/or reproducing apparatus which is adapted to form oblique recording tracks in succession on a magnetic tape to record or playback serial data using a magnetic head provided on a rotating drum, comprises tracking control means for controlling the height of the magnetic head to vary in the direction perpendicular to the recording track and, speed control means for controlling the rotating speed of the rotating drum and/or the traveling speed of the magnetic tape 3 to vary in accordance with the bit transfer rate of the serial data so that the magnetic tape travels one reference track pitch while the rotating drum makes an integral number of rotations.

As constructed, the magnetic tape travels one reference track pitch while the rotating drum 2 makes an integral number of rotations as a result the magnetic head may provide just-tracking at a predetermined pitch. In addition, and further the range of displacement of the magnetic head 6DT can be reduced upon the just-tracking.

DETAILED DESCRIPTION OF THE PREFERRED EMBODIMENTS

An embodiment of the present invention will be described below in detail with reference to the accompanying drawings.

Figure 1:
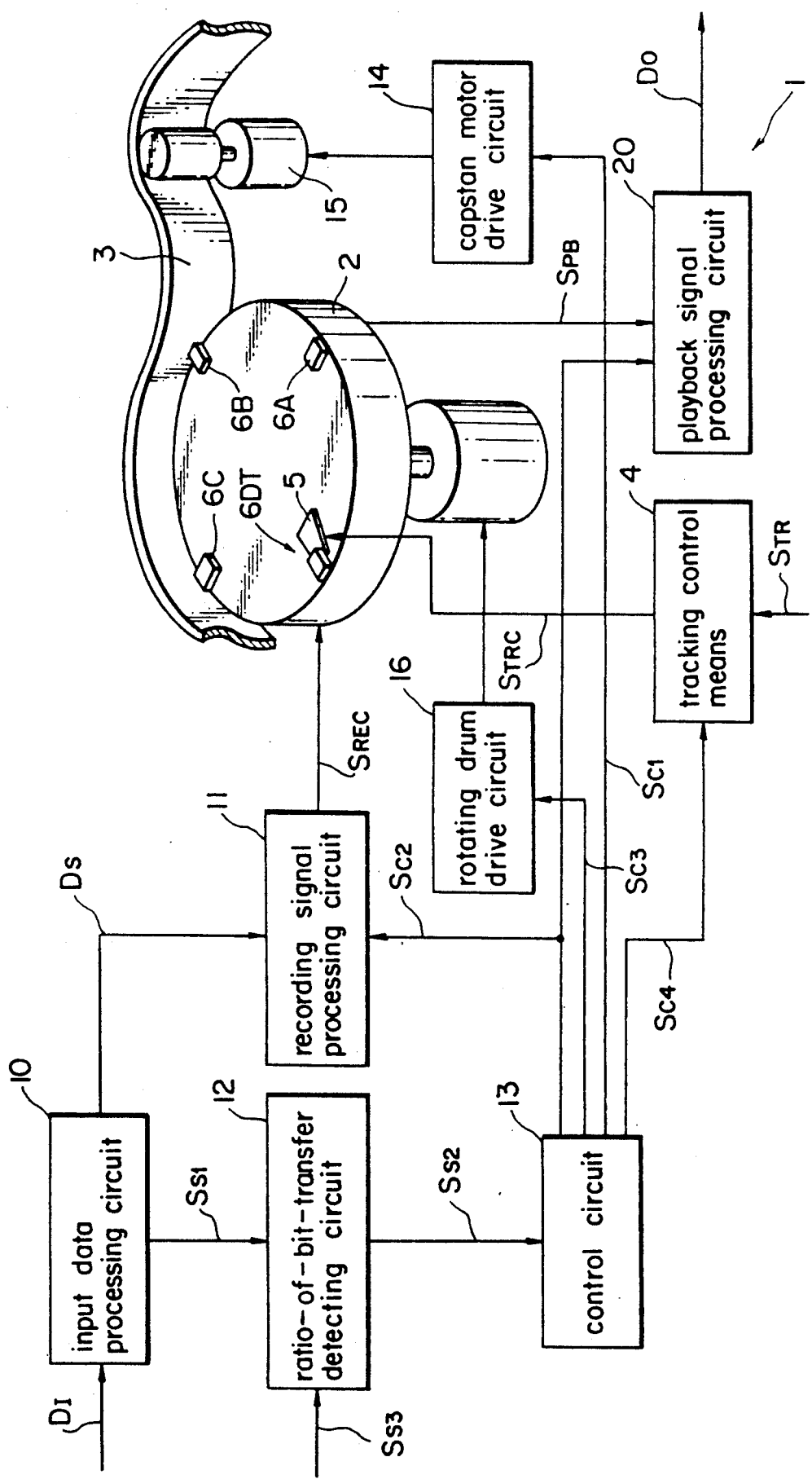
FIG. 1 is a block diagram showing an embodiment of the present invention.

Referring to FIG. 1, reference numeral 1 denotes an apparatus which is adapted to record digital data at a predetermined recording wavelength on a magnetic tape 3 which is wrapped around a rotating drum 2 at a wrap angle of approximately 180°, and also to playback or reproduce and output the record data at a desired bit transfer rate.

On the rotating drum 2, there are disposed, at 90° intervals, magnetic heads 6A, 6B, and 6C along with a DT head 6DT. The DT head 6DT is a magnetic head attached to the rotating drum 2 through a bimorph plate 5 formed of a piezoelectric device whose height is adapted to be varied in the direction perpendicular to the recording track in response to a tracking control signal $S_{TRC}$ supplied from a tracking control circuit 4. The magnetic heads 6A, 6B and 6C, are fixed on the rotating drum 2 at a predetermined height.

According to the present embodiment, when serial data at a fast bit transfer rate is to be recorded, a recording signal $S_{REC}$ is supplied to the magnetic heads 6A–6C and 6DT to enabale the serial data to be sequentially recorded along the recording tracks.

When serial data at a fast bit transfer rate is to be obtained at playback, a playback signal $S_{PB}$ sequentially obtained from the magnetic heads 6A–6C and 6DT is subjected to signal processing.

On the other hand, when serial data at a slower bit transfer rate than some predetermined value is to be recorded, only the DT head 6DT from among the magnetic heads 6A–6C and 6DT is used for the recording of the serial data.

When serial data at the slower bit transfer rate is to be obtained, the playback signal $S_{PB}$ obtained through the DT head 6DT is subjected to signal processing.

Hereafter, in the present specification, the mode of operation for recording and playback of serial data by the use of the magnetic heads 6A–6C and 6DT will be called the variable speed mode and the mode of operation for recording and playback by the use of only the DT head 6DT will be called the DT head mode.

Referring to FIG. 1, it will be seen that an input data processing circuit 10 upon receipt digital data $D_I$ and converts the same into serial data $D_S$ which is outputted to a recording signal processing circuit 11. The data processing circuit 10 detects the bit transfer rate of the serial data $D_S$ and outputs the result as a bit-transfer-rate detected signal $S_{S1}$ to a ratio-of-bit-transfer detecting circuit 12.

For recording, the ratio-of-bit-transfer detecting circuit 12 detects, based on the received bit-transfer-rate detected signal $S_{S1}$, the ratio of the bit transfer rate of the serial data $D_S$ to the fastest bit transfer rate of the data which the data recorder 1 can record and playback. The fastest bit transfer rate is the rate for which recording and playback is achieved with the scanning speed of the magnetic heads 6A–6C and 6DT relative to the magnetic tape 3 set at the maximum speed within the range of variable speeds. The rotating speed of the rotating drum 2 and the traveling speed of the magnetic tape 3 for such maximum scanning speed are hereinafter called the maximum rotating speed and the maximum traveling speed, respectively, at such fastest or maximum bit transfer rate. The ratio-of-bit-transfer detecting circuit outputs the detected result as a ratio-of-bit-transfer detected signal $S_{S2}$ to a control circuit 13.

During playback, a bit-transfer-rate detected signal $S_{S3}$ is received as a result of an operator input of a designated bit transfer rate (which is the bit transfer rate of the serial data $D_O$ to be output from the data recorder 1). The ratio of the bit transfer rate to the maximum bit transfer rate is detected by the circuit 12 and the detected result is output as the ratio-of-bit-transfer detected signal $S_{S2}$ to the control circuit 13.

The ratio of the bit transfer rate to the maximum bit transfer rate obtained on the basis of the bit-transfer-rate detected signal $S_{S1}$ and $S_{S3}$ will hereinafter be called the ratio of bit transfer.

The control circuit 13 switches the mode of the data recorder 1 to the variable speed mode when the ratio of bit transfer represented by the signal $S_{S2}$ is higher than the ratio of the number of the DT head 6DT to the total number of the magnetic heads 6A–6C and 6DT attached to the rotating drum 2 (i.e., value $\frac{1}{4}$).

On the other hand, when the ratio of the bit transfer rate is less than the value $\frac{1}{4}$, the control circuit 13 switches the mode of the data recorder 1 to the DT head mode.

Specifically, the control circuit 13 outputs a control signal $S_{C1}$ to a capstan motor drive circuit 14 to control the rotating speed of a capstan motor 15. In the variable speed mode so that the traveling speed of the magnetic tape 3 is suitably varied for making the ratio of the traveling speed of the magnetic tape 3 to the maximum traveling speed equal to the ratio of bit transfer.

The control circuit 13, in addition, outputs a switching control signal $S_{C2}$ and a drum servo control signal $S_{C3}$ to the recording signal processing circuit 11 and a rotating drum drive circuit 16, respectively. In the variable speed mode, the recording signal processing circuit 11 generates a recording signal $S_{REC}$ by modulating the serial data $D_S$. The recording signal $S_{REC}$ is sequentially supplied to the magnetic heads 6A–6C and 6DT while the rotating speed of the rotating drum 2 is controlled to vary so that the ratio of the rotating speed of the rotating drum 2 to the maximum rotating speed may become equal to the ratio of bit transfer.

Thus, when the bit transfer ratio is within the range from value 1 to the first reference value $\frac{1}{4}$, the traveling speed of the magnetic tape 3 and the rotating speed of the rotating drum 2 are controlled to vary in proportion to the ratio of bit transfer. Thereby the scanning speed of the magnetic heads 6A–6C and 6DT on the magnetic tape 3 are controlled to vary in accordance with the bit transfer rate of the serial data $D_S$. Thus, the serial data $D_S$ is recorded at the predetermined recording wavelength on the magnetic tape 3.

The serial data is transferred at a rate within the range from a bit transfer rate R to the maximum bit transfer rate $R_{max}$. The rate R is expressed as:

$$R = R_{max} \cdot f_{min}/f_{max} \qquad (1)$$

where $R_{max}$ represents the maximum bit transfer rate, $f_{max}$ represents the maximum rotating speed of the rotating drum 2, and $f_{min}$ represents the rotating speed of the same at the first reference value.

In the DT head mode, the rotating drum 2 is rotated at the maximum rotating speed, and a recording signal $S_{REC}$, obtained as a result of compression of the serial data $D_S$ along the time base followed by modulation of the same, is supplied to the DT head 6DT.

The control circuit 13 controls the traveling speed of the magnetic tape 3 in the DT head mode in accordance with the bit transfer rate so that the magnetic tape 3 travels one reference track pitch T while the rotating drum 2 makes an integral number of rotations.

More particularly, within the range of the bit-transfer-rate from the value ¼ to the value ⅛, the magnetic tape 3 travels one reference track pitch T while the rotating drum 2 makes four rotations and, within the range from the value ⅛ to the value 1/12, the magnetic tape 3 is arranged to travel one reference track pitch T while the rotating drum 2 makes eight rotations.

Similarly, within the ranges from the value 1/12 to the value 1/16, from the value 1/16 to the value 1/20, ..., the magnetic tape 3 travels one reference track pitch T while the rotating drum 2 makes 12 rotations, 16 rotations, ..., respectively.

In forming the recording tracks with the DT head 6DT varied in height, the scanning locus of the DT head 6DT may be at the position shifted by one reference track pitch T in the forward direction from the position where the DT head 6DT has formed a record track, while the rotating drum 2 makes 4 rotations, 8 rotations, 12 rotations, ...

Hence, by controlling the height of the DT head 6DT in the DT head mode so that the scanning locus of the DT head 6DT coincides with the scanning locus in the variable speed mode, recording tracks are formed in succession at the reference track pitch and the predetermined angle to the traveling direction of the magnetic tape 3.

More particularly, the control circuit 13, in controlling the height of the DT head 6DT outputs a control signal $S_{C4}$ to the tracking control circuit 4, causing the DT head 6DT, when positioned to start a scan along a recording track, to have its height shifted in the backward direction by an amount corresponding to the bit transfer rate. While the DT head 6DT scans the magnetic tape 3, the height of the DT head 6DT is gradually shifted in the forward direction. When the head reaches the position at the end of the track scan, the height of the DT head 6DT is shifted in the forward direction, conversely to that at the starting side, by the same amount of shift.

Figure 2:
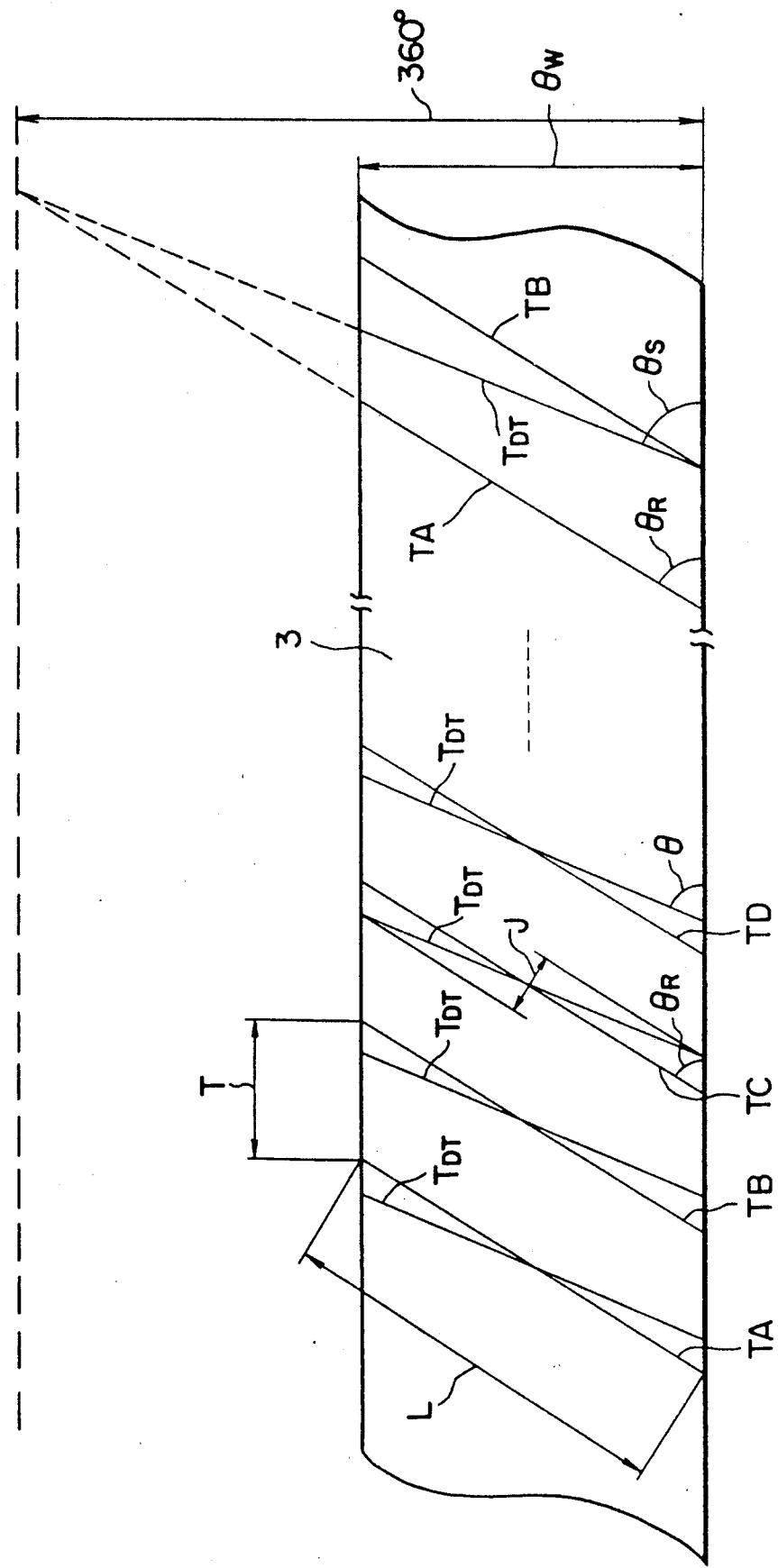
FIG. 2 is a schematic diagram for explaining operation of the same.

As shown in FIG. 2, the lap angle of the magnetic tape 3 (180° in the present case) is denoted by $\theta_W$, the recording track length is denoted by L, the scanning loci of the magnetic heads 6A–6C and 6DT in the variable speed mode is denoted by TA, TB, TC and TD, respectively, and their angle of inclination by $\theta_R$. In addition, the scanning loci of the DT head 6DT when its height is not controlled to vary in the DT head mode is denoted by $T_{DT}$, and its angle of inclination is denoted by $\theta$. The range of displacement of the DT head 6DT denoted by J then is given by $$J = L \cdot \sin(\theta - \theta_R) \cdot (1 - R/R_{max}). \qquad (2)$$

Accordingly, when the traveling speed of the magnetic tape 3 is 0, and hence the bit transfer rate $R/R_{max}$ is 0, then the range of displacement J becomes a maximum. Denoting the angle of inclination of the scanning loci $T_{DT}$ by $\theta_S$, $J_{MAX}$ is given by the following formula to provide the maximum range of displacements:

$$J_{MAX} = L \cdot \sin(\theta_S - \theta_R) \qquad (3)$$

Since the lap angle is 180° in the present case, the range of displacement $J_{MAX}$ becomes $$J_{MAX} = T/2. \qquad (4)$$

Thus by controlling the traveling speed of the magnetic tape 3 to vary in accordance with the bit transfer rate such that the magnetic tape 3 travels one reference track pitch T while the rotating drum 2 makes an integral number of rotations, the range of displacement of the DT head 6DT can be reduced to 1/1.5 of that in the prior art.

In the described embodiment the rate-of-bit-transfer detecting circuit 12, the control circuit 13, the capstan motor drive circuit 14, and the capstan motor 15 together constitute a speed control means for variably controlling the traveling speed of the magnetic tape 3 so that the magnetic tape 3 travels one reference track pitch T while the rotating drum 2 makes an integral number of rotations.

The tracking control circuit 4, the bimorph plate 5, and the control circuit 13 constitute a tracking control means for controlling the DT head 6DT disposed on the rotating drum 2 to vary the height of the head 6DT in the direction perpendicular to the recording track.

The control circuit 13 further controls the record signal processing circuit 11 so that the serial data $D_S$ is compressed, modulated, and output at the timing of the scans made by the DT head 6DT along predetermined recording tracks. The serial data $D_S$ is compressed 4 times, 8 times, 12 times, and 16 times within respective ranges of bit transfer rates.

Thus, in the DT head mode, a second reference value k defined as $$k = n/N. \qquad (5)$$

where N represents the total number of the magnetic heads 6A–6C and 6DT disposed on the rotating drum, and n represents the number of the DT heads 6DT within the range of the bit transfer rate slower than the value R, where R is given by the following formula:

$$R = k \cdot R_{MAX} \qquad (6)$$

Serial data $D_S$ at the bit transfer rate expressed as $$R = R_{MAX} \cdot n/N \cdot 1/S, \qquad (7)$$

where S is an arbitrary integer, then can be recorded at the predetermined recording wavelength.

Thus, even if the bit transfer rate of the serial data $D_S$ varies widely, the serial data can be recorded at the predetermined recording wavelength.

In playing back, the control circuit 13 provides driving control of the capstan motor 15 and the rotating drum 2 in the same way as in recording. The control circuit 13 also performs switching control to vary the operations of a playback signal processing circuit 20.

In the variable speed mode, the playback signal $S_{PB}$ is sequentially obtained from the magnetic heads 6A, 6B, 6C and 6DT and is demodulated and output as serial data $D_O$.

In the DT head mode, in reverse sequence to that for recording, the playback signal $S_{PB}$ obtained from the DT head 6DT is demodulated when the DT head 6DT successively scans the recording tracks, and then expanded along the time base and output.

At that time, the control circuit 13 outputs a control signal $S_{C4}$ to the tracking control circuit 4 and performs tracking control of the DT head 6DT in response to a tracking error signal $S_{TR}$ supplied from a tracking error detecting circuit (not shown).

The control circuit 13 also outputs the control signals $S_{C1}$ and $S_{C3}$ causing the rotating drum 2 to be rotated at its maximum rotating speed and the magnetic tape 3 to be controlled to vary its traveling speed in accordance with the bit transfer rate of the serial data $D_O$ so that the magnetic tape 3 travels one reference track pitch while the rotating drum 2 makes an integral number of rotations.

Thus, in the variable speed mode, within the range over the first reference value, the serial data $D_O$ can be obtained at a desired bit transfer rate by demodulating the playback signal $S_{PB}$.

Further, in the DT head mode, the serial data $D_O$ corresponding to the bit-transfer-rate detected signal $S_{S3}$ can be obtained by expanding the demodulated playback signal along the time base. In addition, the range of displacement of the DT head 6DT can be reduced to 1/1.5 of that in the prior art, as was the case at the time of recording.

Although, in the foregoing description of the embodiment, for magnetic heads are disposed on the rotating drum and one of the magnetic heads is a DT head, the numbers of the magnetic heads and the number of DT heads are not limited to the number described but can be selectively changed to different numbers according to the need.

Although the operating modes as described are switched according to the bit transfer rate, the present invention is not limited to such switching but is also applicable to the case where only the DT head mode is used.

Although, the rotating speed of the rotating drum was set to the maximum rotating speed and the traveling speed of the magnetic tape was controlled to vary stepwise in accordance with the bit transfer rate during the DT head mode, the present invention is not so limited, but can also be embodied to have the rotating speed of the rotating drum changed stepwise while the magnetic tape is driven at a predetermined traveling speed, or to have the speeds of both the rotating drum and the magnetic tape changed stepwise.

Although the traveling speed of the magnetic tape is described as being changed using the maximum bit transfer rate as the reference value, the present invention is not so limited. A predetermined bit transfer rate also can be used as the reference value.

Although, the ratio of bit transfer as described is obtained from the bit transfer rate and, based on the ratio, the traveling speed of the magnetic tape is changed, the present invention is not so limited. The traveling speed, for example, also can be changed directly based on the bit transfer rate.

Although the traveling speed of the magnetic tape as described is changed both at the time of recording and at the time of playback, the present invention is not so limited. The traveling speed of the magnetic tape also can be adapted to change only at the time of recording or at the time of playback.

Further, the above embodiment is described as applied to a data recorder, but the application of the present invention is not limited to such application. The invention can be widely applied to a magnetic recording and playback apparatus adapted to record and playback a video signal obtained from an image processing apparatus.

According to the present invention as described above, a magnetic recording and playback apparatus is obtained in which the range of displacement of the DT head is made smaller than that in the prior art apparatus by controlling the rotating speed of the rotating drum or the traveling speed of the magnetic tape to vary in accordance with the bit transfer rate of the serial data. The magnetic tape, thereby, is caused to travel one reference track pitch while the rotating drum makes an integral number of rotations.

What is claimed is:

1. A magnetic recording and playback apparatus having a dynamic tracking magnetic head disposed on a rotating drum for scanning successive oblique recording tracks on a magnetic tape to record or play back serial digital data along the tracks, comprising:
    tracking control means for controlling the position of said dynamic tracking magnetic head on said rotating drum in a direction perpendicular to said recording tracks in accordance with a bit transfer rate of said serial digital data;
    speed control means for controlling at least one of a rotating speed of said rotating drum and a traveling speed of said magnetic tape in accordance with the bit transfer rate of said serial data; and
    processor means for time-compressing said serial data to produce time-compressed serial data, said dynamic tracking magnetic head being coupled to receive said time-compressed serial data for recording said time-compressed serial data while said dynamic tracking magnetic head scans said recording tracks.

2. A magnetic recording and playback apparatus according to claim 1, wherein said speed control means controls said rotating speed and said traveling speed so that said magnetic tape travels one reference track pitch while said rotating drum makes an integral number of rotations, said integral number being determined in accordance with the bit transfer rate of said serial data.

3. A magnetic recording and playback apparatus according to claim 2, further comprising detecting means for detecting the bit transfer rate of said serial data and comparator means for producing a control signal when the detected bit transfer rate of said serial data is below a first predetermined bit transfer rate, and wherein, in response to said control signal, said processor means is rendered active to time-compress said serial data and said tracking control means is activated to control the position of the dynamic tracking magnetic head so as to vary the position of the dynamic tracking magnetic head in said perpendicular direction while said dynamic tracking magnetic head performs recording and playback.

4. A magnetic recording and playback apparatus according to claim 3, wherein said comparator means is operative when the detected bit transfer rate of said serial data is above a second predetermined bit transfer rate, to inactivate said processor means and to render said tracking control means inoperative to vary the position of the dynamic tracking magnetic head in said perpendicular direction while said dynamic tracking magnetic head performs recording and playback.

5. A magnetic recording and playback apparatus according to claim 4, wherein said speed control means is operative when the detected bit transfer rate of said serial data is above said second predetermined bit transfer rate to variably control said rotating speed of said rotating drum in accordance with the bit transfer rate of said serial data.

6. A magnetic recording and playback apparatus according to claim 5, wherein said first predetermined bit transfer rate and said second predetermined bit transfer rate are the same.

* * * * *